United States Patent
Goodman et al.

(10) Patent No.: US 12,542,687 B1
(45) Date of Patent: Feb. 3, 2026

(54) SECURED ONBOARDING OF TEMPORARILY TRANSFERRED ENDPOINT DEVICES

(71) Applicant: Dell Products L.P., Round Rock, TX (US)

(72) Inventors: Bradley K. Goodman, Nashua, NH (US); Joseph Caisse, Burlington, MA (US)

(73) Assignee: Dell Products L.P., Round Rock, TX (US)

( * ) Notice: Subject to any disclaimer, the term of this patent is extended or adjusted under 35 U.S.C. 154(b) by 66 days.

(21) Appl. No.: 18/788,296

(22) Filed: Jul. 30, 2024

(51) Int. Cl.
| | |
|---|---|
| H04L 9/30 | (2006.01) |
| H04L 9/32 | (2006.01) |
| H04L 9/40 | (2022.01) |

(52) U.S. Cl.
CPC .......... *H04L 9/3265* (2013.01); *H04L 9/3073* (2013.01); *H04L 9/3247* (2013.01); *H04L 9/3263* (2013.01); *H04L 63/0823* (2013.01); *H04L 63/10* (2013.01)

(58) Field of Classification Search
CPC ... H04L 9/3265; H04L 9/3073; H04L 9/3263; H04L 9/3247; H04L 63/0823; H04L 63/10
USPC ....................................................... 713/157
See application file for complete search history.

(56) References Cited

U.S. PATENT DOCUMENTS

| | | | | |
|---|---|---|---|---|
| 10,855,674 | B1 * | 12/2020 | Geusz | H04L 63/20 |
| 11,368,315 | B2 * | 6/2022 | Atkins | H04L 9/3239 |
| 11,601,288 | B1 * | 3/2023 | Bacon | H04L 63/205 |
| 2012/0291140 | A1 * | 11/2012 | Robert | G06F 21/105 |
| | | | | 726/28 |
| 2017/0180132 | A1 * | 6/2017 | Osborne | H04L 9/0631 |
| 2020/0327231 | A1 * | 10/2020 | Smith | G06F 21/33 |
| 2021/0021432 | A1 * | 1/2021 | Atkins | H04L 9/50 |
| 2022/0286302 | A1 * | 9/2022 | Singh | H04L 9/3265 |
| 2023/0008885 | A1 * | 1/2023 | Khatri | G06F 21/602 |
| 2023/0011005 | A1 * | 1/2023 | Khatri | G06F 21/44 |
| 2023/0229758 | A1 * | 7/2023 | Terpstra | G06F 21/54 |
| | | | | 726/26 |
| 2023/0229778 | A1 * | 7/2023 | Terpstra | G06F 21/73 |
| | | | | 713/2 |
| 2023/0325535 | A1 * | 10/2023 | Sharma | G06F 21/33 |
| | | | | 726/17 |
| 2023/0325849 | A1 * | 10/2023 | Sharma | H04L 9/3247 |
| | | | | 705/318 |
| 2023/0325850 | A1 * | 10/2023 | Khokhar | H04L 9/0825 |
| | | | | 705/318 |
| 2023/0394493 | A1 * | 12/2023 | Rao | H04L 63/0823 |
| 2024/0086205 | A1 * | 3/2024 | Haddad | G06F 21/575 |
| 2024/0413982 | A1 * | 12/2024 | Prabhakar | H04L 9/3268 |

* cited by examiner

*Primary Examiner* — Thanh T Le
(74) *Attorney, Agent, or Firm* — WOMBLE BOND DICKINSON (US) LLP

(57) ABSTRACT

Methods and systems for managing endpoint devices are disclosed. The endpoint devices may be managed by onboarding them. To onboard the endpoint devices, ownership vouchers may be used to cryptographically verify to which entities authority over the endpoint devices have been delegated. The ownership vouchers may also include temporary delegations of ownership and/or authority from one entity to another entity. The temporary delegations may be provided as a lease, a rental, a subscription, or the like.

20 Claims, 12 Drawing Sheets

SECURED ONBOARDING OF TEMPORARILY TRANSFERRED ENDPOINT DEVICES

FIELD

Embodiments disclosed herein relate generally to device management. More particularly, embodiments disclosed herein relate to systems and methods to manage late-bound onboarding of devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components, and hosted entities such applications, may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
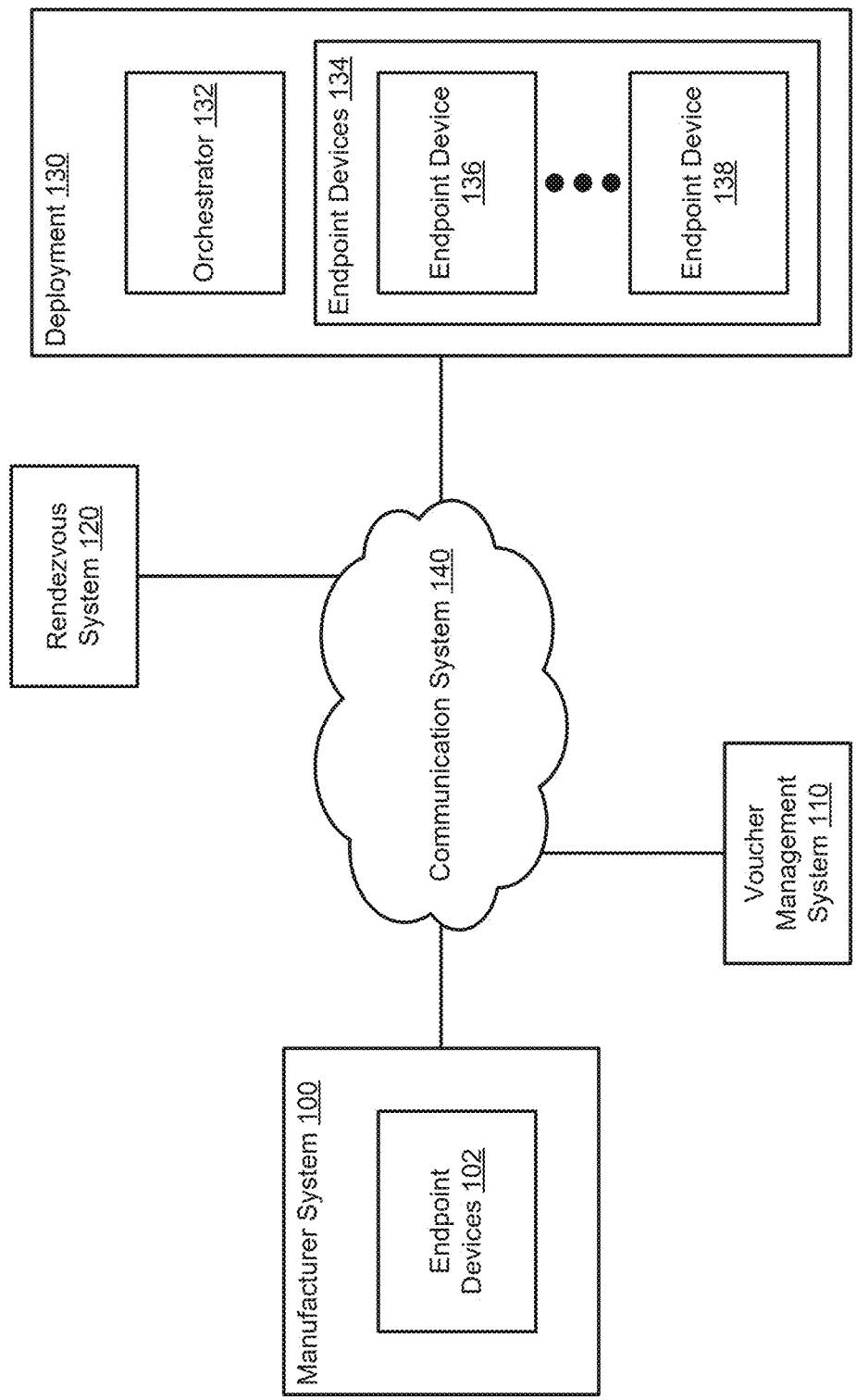
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing authority in a distributed system. To manage authority, endpoint devices may be onboarded.

During onboarding, authority over the endpoint devices may be established. To establish the authority, ownership vouchers, and/or other data structures may be presented to the endpoint devices. The endpoint devices may utilize these data structures to identify the entities that have authority over the endpoint devices.

The ownership vouchers may delegate authority over the endpoint devices by including public keys. The public keys may be used to demonstrate that an entity (e.g., an orchestrator or other device making up a control plane of a deployment or the like) alleged to have authority of the endpoint device has access to corresponding private keys.

These ownership vouchers may also be configured to contain a temporary delegation of ownership and/or authority over an endpoint device. For example, assume that a current owner with full ownership and/or authority over the endpoint device (e.g., a reseller, manufacturer, service provider, or the like) wishes to provide (e.g., lend, lease, provide as part of a subscription service, or the like) the endpoint device to another entity but does not wish to relinquish the full ownership and/or authority to the new entity. The current owner may still achieve this goal by including a temporary delegation of ownership and/or authority (also referred to herein simply as a "temporary delegation of authority") within the ownership voucher.

The temporary delegation of authority included in the ownership voucher may include delegation expiration data. The delegation expiration data may, for example, include a date and time at which the temporary delegation of authority should end (e.g., when the lending process, lease, subscription service, or the like is scheduled to end). Once the temporary delegation of authority ends, ownership and/or authority of the endpoint device automatically revert back (e.g., via the ownership voucher) to the entity that conveyed the temporary delegation of authority.

In embodiments, multiple temporary delegations of authority may be made (e.g., via a subleasing process or the like) as long as subsequent ones of the temporary delegations do not extend past an expiration date and time of the first temporary delegation of authority.

As a result, embodiments disclosed herein provide a direct improvement (e.g., a technological improvement) to the field of device onboarding technology. Namely, secure onboarding techniques and protocols such as Fast IDentity Online (FIDO) Device Onboarding (FDO)) mechanisms are not capable of distinguishing between the concepts of "transfer of control" and "transfer of ownership". Therefore, current FDO mechanisms and protocols are not able to provide a secured transfer of temporary ownership and/or authority (e.g., when an endpoint device is lent out, leased, provided as part of a limited subscription service, or the like). Thus, embodiments disclosed herein that provide an enhanced mechanism for conveying "control" (e.g., temporary control) over an endpoint device via the temporary delegation of authority included in the ownership voucher at least improves upon the current constraints of currently available FDO mechanisms and protocols.

Additionally, by conveying the permanent and/or temporary delegations of ownership through the ownership voucher (e.g., the cryptographically secure ownership voucher), security for these endpoint devices when these endpoint devices are being onboard can advantageously be improved. Said another way, embodiments disclosed herein provide yet another direct improvement (e.g., a technological improvement) to the field of device onboarding technology through enhancement of the security (e.g., via use of the ownership voucher) provided during the endpoint device onboarding process.

Even further, with the use of the ownership vouches, embodiments disclosed herein may also address, among others, the technical problem of establishing a more secured method for establishing and validating authority (e.g., back to a root of trust or the like) in a distributed system.

In an embodiment, a method for managing endpoint devices is provided. The method may include, during an onboarding of an endpoint device of the endpoint devices and by the endpoint device: obtaining an ownership voucher, the ownership voucher comprising a temporary delegation of authority to a first entity, the first entity attempting to complete the onboarding of the endpoint device; validating, using the ownership voucher and the temporary delegation of authority to the first entity, whether the first entity truly has authority to complete the onboarding; and based on the validating, terminating or completing the onboarding of the endpoint device.

Prior to the onboarding being started and completed, the endpoint device is in a state that is unable to provide any computer-implemented services for any entity, including the first entity, in possession of the endpoint device.

Validating whether the first entity truly has the authority to complete the onboarding comprises, at least: making a first determination that the ownership voucher comprises the temporary delegation of authority to the first entity; making a second determination, in response to the first determination, as to whether the temporary delegation of authority has expired; in a first instance of the second determination where the temporary delegation of authority has expired, terminating the onboarding of the endpoint device to obtain an onboarding-failed endpoint device; in a second instance of the second determination where the temporary delegation of authority has not expired, performing a first attempt to validate that the temporary delegation of authority to the first entity is valid; and in a first instance of the first attempt where the temporary delegation of authority to the first entity is validated as being valid, concluding that the first entity truly has the authority to complete the onboarding. Based on concluding that the first entity truly has the authority to complete the onboarding, the method further comprises, by the endpoint device: performing one or more actions to complete the onboarding of the endpoint device.

The state is a late-bounding state where the endpoint device, prior to the onboarding being started, is not provisioned with a host operating system (OS).

The endpoint device is physically deployed to a deployment, the deployment comprising a control plane that comprises onboarding data for the onboarding of the endpoint device, and performing the one or more actions to complete the onboarding of the endpoint device comprises, at least: obtaining the onboarding data from the control plane; and using the onboarding data to complete the onboarding, the onboarding data comprising instructions and data for installing the host OS.

The onboarding is part of a zero-touch secure provisioning (ZTSP) process, and the first entity attempting to complete the onboarding of the endpoint device has physical possession over the endpoint device.

The ownership voucher comprises a certificate that comprises the temporary delegation of authority to the first entity, the temporary delegation of authority comprising, at least: a public key of a public private key pair belonging to the first entity; delegation expiration data specifying expiration information at which the temporary delegation of authority to the first entity expires. The certificate is cryptographically signed by a private key of a second entity that conveyed the temporary delegation of authority to the first entity, the private key being part of a public private key pair of the second entity.

The ownership voucher further comprises a certificate chain comprising certificates, the certificate being one of the certificates, and performing the first attempt further comprises, as part of the first instance of the first attempt, making a third determination that the certificate chain can be cryptographically validated, starting at the certificate, back to a root of trust stored on the endpoint device.

In a second instance of the first attempt where the temporary delegation of authority to the first entity is validated as being invalid, terminating the onboarding to obtain the onboarding-failed endpoint device.

The temporary delegation of authority to the first entity is a first temporary delegation among two temporary delegations included in the ownership voucher, the first temporary delegation being temporally conveyed after a second temporary delegation of the two temporary delegations. Making the second determination further comprises making an extended second determination to determine whether the temporary delegation has expired and whether the first temporary delegation includes a first expiration information that exceeds a bounds of a second expiration information of the second temporary delegation.

In a first instance of the extended second determination where the first temporary delegation has not expired and where the first expiration information has not exceeded the bounds of the second expiration information, performing the first attempt to validate that the first temporary delegation is valid, in a second instance of the extended second determination where the first temporary delegation has not expired and where the first expiration information has exceeded the bounds of the second expiration information, terminating the onboarding of the endpoint device to obtain the onboarding-failed endpoint device, and in a third instance of the extended second determination where the first temporary delegation has expired, terminating the onboarding of the endpoint device to obtain the onboarding-failed endpoint device.

The temporary delegation of authority in the ownership voucher has not been previously validated by another entity or computing device before being validated by the endpoint device after a start of the onboarding of the endpoint device.

In an embodiment, a non-transitory media is provided. The non-transitory media may include instructions that when executed by a processor cause the computer-implemented method to be performed.

In an embodiment, a data processing system (e.g., an endpoint device) is provided. The data processing system may include the non-transitory media and a processor, and may perform the method when the computer instructions are executed by the processor.

Turning to FIG. 1A, a block diagram illustrating a system in accordance with an embodiment is shown. The system shown in FIG. 1A may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, any number of endpoint devices may be deployed to a deployment. The endpoint devices may cooperatively provide the computer implemented services.

To manage the endpoint devices to provide the computer implemented services, authority over the endpoint devices may need to be established. In other words, the endpoint devices must be able to ascertain that they are under the authority of a particular entity. Based on this authority, the entity may, for example, issue work order and/or other types of instructions to manage the operation of the endpoint devices to provide desired computer implemented services.

To facilitate ascertaining of the authority over them, the endpoint devices may utilize secrets. The secrets may allow the endpoint devices to cryptographically verify delegations of authority over the endpoint devices from a root of trust (e.g., a trusted key of a manufacturer) to another entity (e.g., a current/present owner of the endpoint devices).

Overtime the resources requirements for providing computer implemented services may change and/or endpoint devices may need to be replaced. For example, additional services may be desired to be provided, different types of services may be desired to be provided, etc. In another example, an endpoint device that contributed to the computer implemented services may cease to operate thereby reducing the quantity of resources available to provide the computer implemented services. To satisfy the resource requirements based on these changes to an exist systems, additional endpoint devices may be onboarded and thereby contribute to the resources available to provide the computer implemented services.

However, onboarding an endpoint device may require access to particular types of cryptographic information. If this cryptographic is not available, then the endpoint devices may not be able to be onboarded.

Further, to facilitate management of large numbers of endpoint devices, multiple management entities such as orchestrators may be utilized. To successfully onboard endpoint devices, the orchestrator that onboards each endpoint device may need to have access to the particular cryptographic information (e.g., the endpoint devices may only recognize the authority of entities that can demonstrate access to the cryptographic information). As system complexity increases, this requirement may be progressively more difficult to meet, and wide scale distribution of cryptographic information may reduce the security of the cryptographic information. If the cryptographic information is compromised by a malicious entity, the malicious entity may utilize the cryptographic information to take authority of the endpoint devices.

In general, embodiments disclosed herein may provide methods, systems, and/or devices for managing endpoint devices to improve their likelihood of being able to cryptographically verify authority over them thereby allowing them to contribute to desired computer implemented services. To improve the likelihood, embodiments disclosed herein may provide a framework for onboarding endpoint devices in a manner that allow for the endpoint devices to verify authority over them without the proliferation of cryptographic information.

The framework may include processes for establishing cryptographic chains of delegation of authority that do not require orchestrators or other management entities to have access to the particular cryptographic information that the endpoint devices rely on for establishing trust. By not requiring that the orchestrators have access to this cryptographic information, the endpoint devices may be onboarded with reduced risk of the cryptographic information being compromised.

To provide the above noted functionality, the system of FIG. 1A may include manufacturer system 100, voucher management system 110, rendezvous system 120, deployment 130, and communication system 140. Each of these components is discussed below.

Manufacturer system 100 may be a system used by a manufacturer of endpoint devices 102. Manufacturer system 100 may include, for example, factories, assembly plants, distribution facilities, and/or other types of facilities for creating endpoint devices 102. Endpoint devices 102 may be data processing systems which may be usable to provide various computer implemented services.

When manufactured, manufacturer system 100 may put endpoint devices 102 in condition for subsequent onboarding to various deployments (e.g., 130) and/or other environments (e.g., data centers, edge systems, etc.) in which endpoint devices may be positioned to provide desired computer implemented services.

Figure 1B:
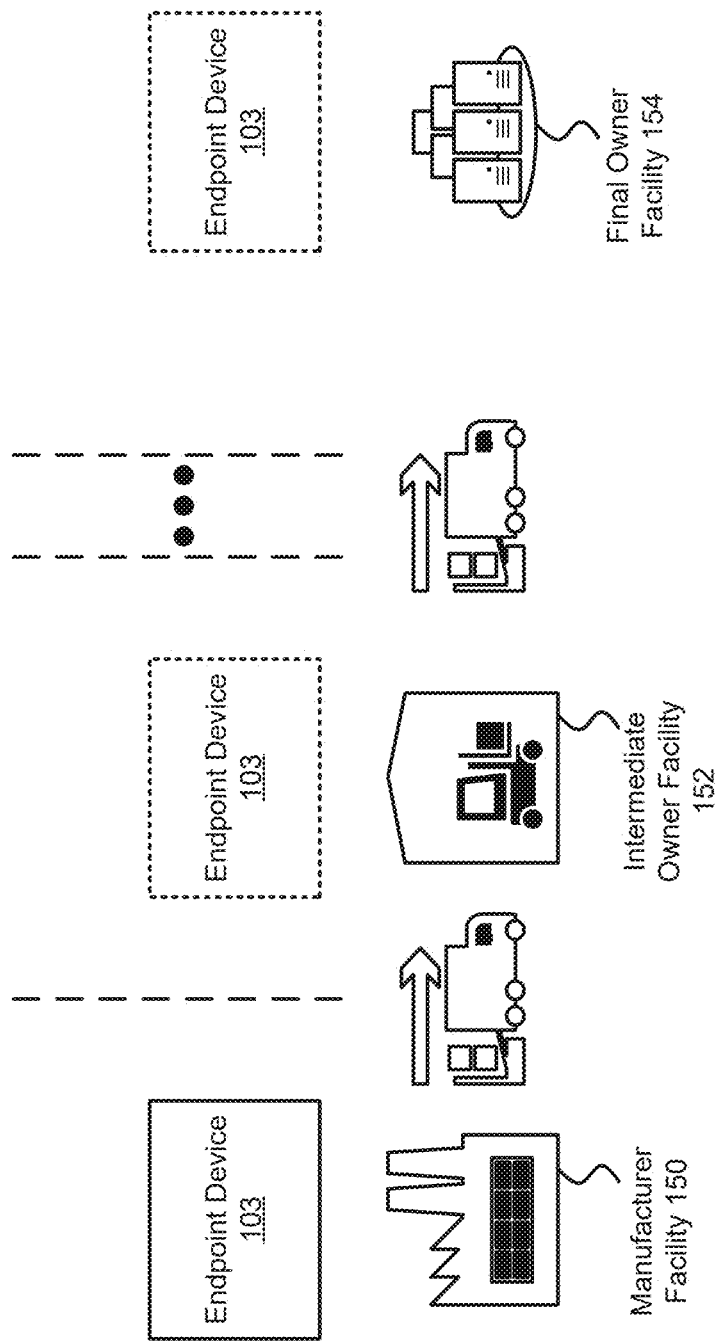
FIGS. 1B-1J show diagrams illustrating aspects of operation of the system of FIG. 1A in accordance with an embodiment.
Figure 1C:
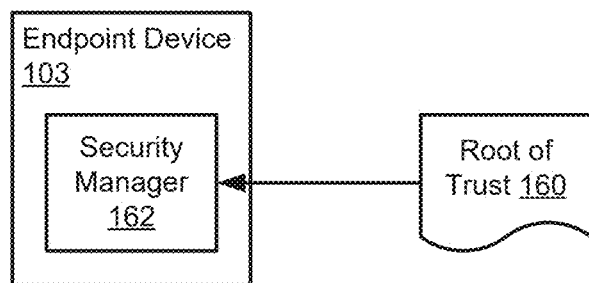

To place endpoint devices 102 in condition for subsequent onboarding, manufacturer system 100 may (i) establish a root of trust for each endpoint device, (ii) record various information regarding the endpoint devices (e.g., hardware/software loadout, identifiers of various components positioned therein, etc.), and (iii) install various pieces of software, establish various configuration settings, update various hardware components, and/or perform other actions so that only entities to which authority over the endpoint devices has been delegated from the root of trust are able to control and/or otherwise use the endpoint device. Refer to FIG. 1C for additional details regarding establishing a root of trust for the endpoint device.

Once constructed, endpoint devices 102 may be sold directly to end users and/or placed into the stream of commerce (e.g., sold to resellers, etc.) and through which endpoint devices 102 eventually reach end users. Refer to FIG. 1B for additional details regarding how endpoint devices may reach end users (e.g., individuals, organizations, etc.).

As ownership over the endpoint devices changes, information regarding the changes in ownership and/or authority may be recorded in an ownership voucher. The ownership voucher may allow an end user to establish authority over the endpoint device such that the endpoint device will be usable by the end user.

Voucher management system 110 may document and manage information regarding changes in ownership and authority over endpoint devices 102. To do so, voucher management system 110 may generate ownership vouchers (e.g., based on information such as the root of trust and other instructions received from the manufacturer system 100). An ownership voucher may be a cryptographically verifiable data structure usable to establish which entities have authority over endpoint devices 102.

For example, an ownership voucher may include certificate chains that documents the changes in ownership and authority over endpoint devices 102. Each certificate may be signed using various keys. The keys used to sign (e.g., private keys) and keys included in (e.g., public keys) in ownership vouchers may enable endpoint devices to ascertain whether to trust various data structures, such as work orders which may be signed. Refer to FIGS. 1D-1I for additional information regarding ownership vouchers.

When one of endpoint devices 102 is obtained by an end user, the end user may add the endpoint devices to a collection such as deployment 130. When so added, an orchestrator (e.g., 132) or other entity may utilize a corresponding ownership voucher from voucher management system 110 to establish authority over the endpoint device. In this manner, any number of endpoint devices (e.g., 134) may be onboarded and brought under the control of a control plane which may include any number of orchestrators (e.g., 132). Different endpoint devices (e.g., 136, 138) may be onboarded at different points in time and/or for different purposes.

However, the ownership voucher provided by voucher management system 110 may delegate authority over the endpoint device to the end user by establishing a public key of a public private key pair maintained by the end user as having been delegated authority over the endpoint device. To issue verifiable work orders or other types of instructions to the endpoint device, the work order may need to be signed by the private key of the public private key pair. This private key of the public private key pair may be stored by the orchestrator 132 (or by the current owner and later provided to the orchestrator 132 when the orchestrator 132 needs to use the private key and the ownership voucher to allow the endpoint device to establish a verifiable chain of delegations of authority from the root of trust to the orchestrator 132).

When one of endpoint devices 102 initially powers on after manufacturing, the endpoint device may reach out to rendezvous system 120. Rendezvous system 120 may be a system that directs endpoint devices to entities such as orchestrator 132 that will onboard the endpoint devices.

To do so, the entities such as orchestrator 132 may provide rendezvous system 120 with information usable to authenticate that orchestrator 132 will manage the endpoint devices. For example, orchestrator 132 may provide information from ownership vouchers, and/or other sources to rendezvous system 120. Once verified, rendezvous system 120 may redirect endpoint devices to the corresponding entities when the endpoint devices reach out to rendezvous system 120 after being powered on.

Once onboarded, endpoint devices 134 may perform various operations to complete onboarding. The operations may include any number and type of operation (e.g., configuration operations, security operations, software installation operations, account establishment operations, license activation and/or application, etc.), and the operations may be directed by orchestrator 132 (or by another source (e.g., the manufacturer system 100) acting as a control plane for the onboarding of the endpoint device). Once onboarded, the endpoint devices may begin to contribute to computer implemented services by deployment 130.

When providing their functionality, any of manufacturer system 100, endpoint devices 102, voucher management system 110, rendezvous system 120, deployment 130, orchestrator 132, and/or endpoint devices 134 may perform all, or a portion, of the processes, interactions, and methods illustrated in FIGS. 1B-3.

Any of manufacturer system 100, endpoint devices 102, voucher management system 110, rendezvous system 120, deployment 130, orchestrator 132, and endpoint devices 134, may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), and edge device, an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 140. Communication system 140 may facilitate communications between the components of FIG. 1A. In an embodiment, communication system 140 includes one or more networks that facilitate communication between any number of components. The networks may include wired networks and/or wireless networks (e.g., and/or the Internet). The networks and communication devices may operate in accordance with any number and types of communication protocols (e.g., such as the Internet protocol).

While illustrated in FIG. 1A as including a limited number of specific components, a system in accordance with an embodiment may include fewer, additional, and/or different components than those illustrated therein.

As discussed above, endpoint devices (e.g., 102) may traverse through a stream of commerce between when the endpoint devices are manufactured and when the endpoint devices reaches a final owner. Turning to FIG. 1B, diagram of an example path through a stream of commerce in accordance with an embodiment is shown.

In FIG. 1B, vertical dashed lines indicate different geographic locations in which various facilities may be positioned. Representations of such facilities (e.g., 150-154) may be positioned below the pages. Representations of movement of endpoint devices between these facilities is illustrated using truck shaped images. Some instances of the graphical representation of endpoint device 103 are illustrated using dashed outlining to indicate that endpoint device 103 may only be present at one of the facilities at any point in time, and the instance of the graphical representation of endpoint device 103 drawn in solid outlining indicates where endpoint device 103 is located in the example shown in FIG. 1B.

The stream of commerce may begin, for example, at manufacturer facility 150. Manufacturer facility 150 may be a facility operated by a manufacturer of endpoint devices. During manufacturing, the manufacturer may establish a root of trust for an endpoint device (e.g., 103). Refer to FIG. 1C for additional details regarding establishing the root of trust for endpoint device 103. The root of trust may be used by endpoint device 103 to discern which entities have authority over it, which entities to trust, and/or for other purposes. The initial root of trust may indicate that the manufacturer is the owner of and has authority over endpoint device 103.

Once the root of trust is established, endpoint device 103 may be sold and resold to various intermediate owners. These intermediate owners may operate various intermediate owner facilities (e.g., 152), such as warehouses, distribution centers, sales rooms, etc. When sold, endpoint device 103 may be shipped to these various facilities.

Finally, once purchased from an intermediate owner, a final owner may operate a final owner facility (e.g., 154), such as a data center, edge deployment, and/or other type of computer deployment to which endpoint device 103 may be onboarded. To facilitate onboarding, voucher management system 110 may collect and add information regarding changes in ownership of endpoint device 103 to an ownership voucher. Orchestrator 132 may use the ownership voucher to establish authority over endpoint device 103.

Additionally, embodiments disclosed herein apply new advents in the practice of Zero-Touch Secure Onboarding (STSO) that provide (in methods and processes such as Zero-Touch Secure Provisioning (ZTSP) and Fast IDentity Online (FIDO) Device Onboarding (FDO)) mechanisms that establish ownership credentials, and even install software on endpoint devices in a "Late-Bound" manner (also referred to herein as "late bound ZTSP process" and "late-bounding state") when the endpoint devices are being onboarded. In embodiments, "Late-Bound" means that software and/or ownership credentials do not to be known or established at the time of manufacturing (e.g., when the endpoint device is being manufactured in manufacturer facility 150), but can be established subsequently (even while the physical endpoint device remains "boxed" during warehousing or transport) after the manufactured endpoint devices have reached the final owner facility 154.

Additionally, such zero-touch processes provide a mechanism for endpoint devices to receive (in a secured and trusted manner) final ownership and/or software data upon first-power-on of these endpoint devices in the field. Such zero-touch processes advantageously eliminate the need to do custom software installation in manufacturing or second-touch, allowing manufactured endpoint devices to be pulled directly from stock and delivered to a customer (and for such customizations to still be dynamically applied in-field, on first-boot/startup/power on). Said another way, prior to the onboarding being started, an endpoint device may not be provisioned with a host operating system (OS).

Turning to FIG. 1C, a diagram of an example process for establishing a root of trust in endpoint device 103 in accordance with an embodiment is shown. To establish a root of trust, when endpoint device 103 is manufactured, root of trust 160 may be installed in endpoint device 103.

Root of trust 160 may be a public key of a public private key pair controlled by the manufacturer of endpoint device 103. The public private key pair may be established using any process.

To install root of trust 160, root of trust 160 may be stored in endpoint device 103. The storage location and security precautions taken with respect to storing root of trust 160 may vary depending on the architecture of endpoint device 103.

For example, endpoint device 103 may host or include a security manager (e.g., 162). Security manager 162 may be implemented using a discrete hardware component, or may be a software component. Security manager 162 may enforce various security policies on endpoint device 103. For example, the security policies may require that endpoint device 103 validate authority over it back to root of trust 160 before complying with any instructions from other entities that allege to have authority over endpoint device 103.

To validate entities having authority over endpoint device 103, endpoint device 103 may utilize ownership vouchers.

Figure 1D:
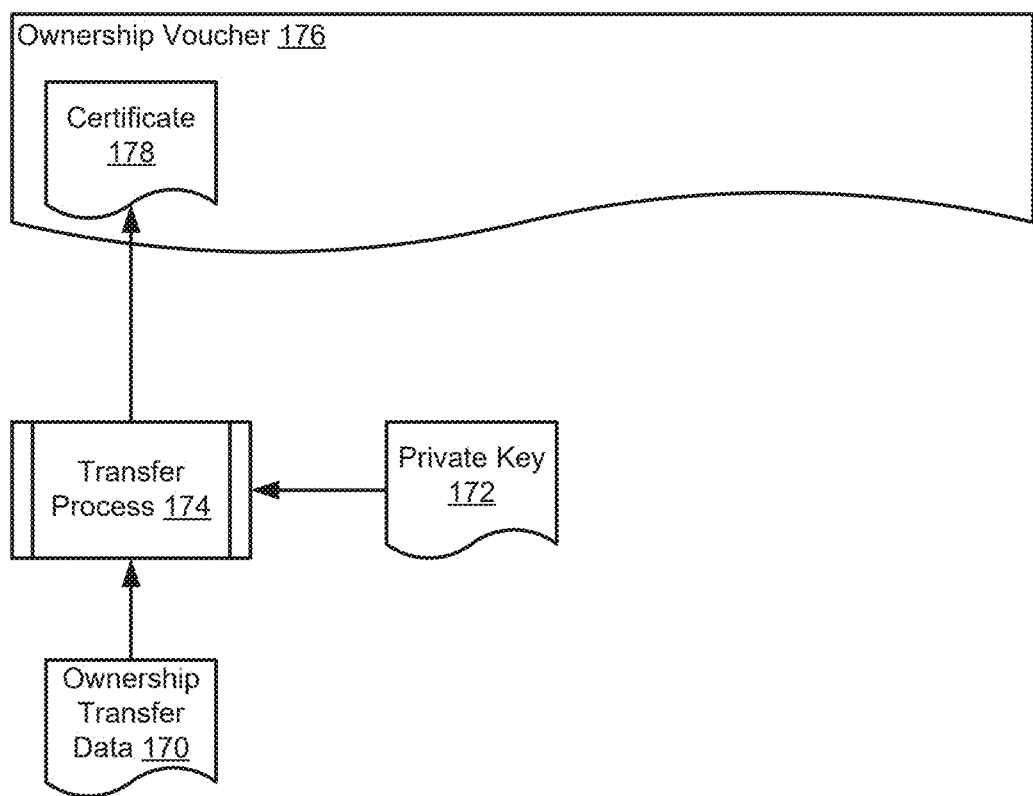
Figure 1E:
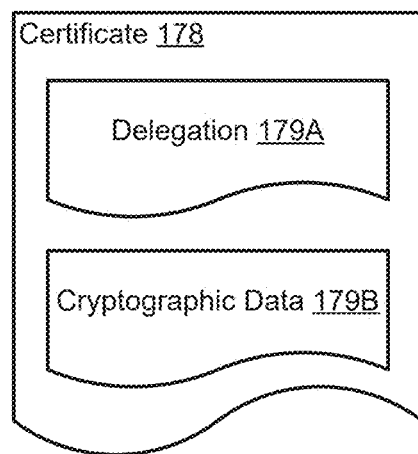

Turning to FIG. 1D, a diagram of an example process for generating ownership voucher 176 in accordance with an embodiment is shown. To generate ownership voucher 176, information regarding changes in ownership and authority over an endpoint device may be added. The information may take the form of a cryptographically verifiable certificate (e.g., 178). Refer to FIG. 1E for additional information regarding certificate 178.

To add a certificate to ownership voucher 176, transfer process 174 may be performed. During transfer process 174, ownership transfer data 170 and private key 172 may be obtained. Ownership transfer data 170 may document a change in ownership and/or authority over an endpoint device. For example, when an endpoint device is sold, a public key of a public private key pair controlled by the purchaser may be added to ownership transfer data 170, along with other types of information regarding the transfer. This public key may be usable to verify signed work orders or other signed data structures from the new owner (e.g., the new owner may be able to use the corresponding private key for signing). The information in ownership transfer data 170 may be treated as a delegation statement, which an endpoint device may parse to identify entities having authority over it.

Figure 1F:
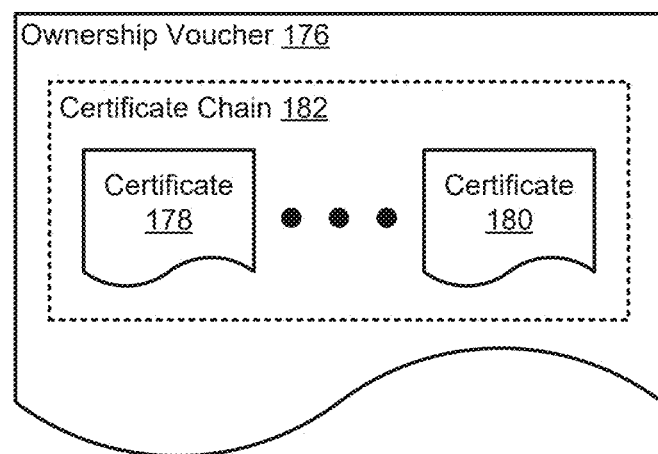
Figure 1G:
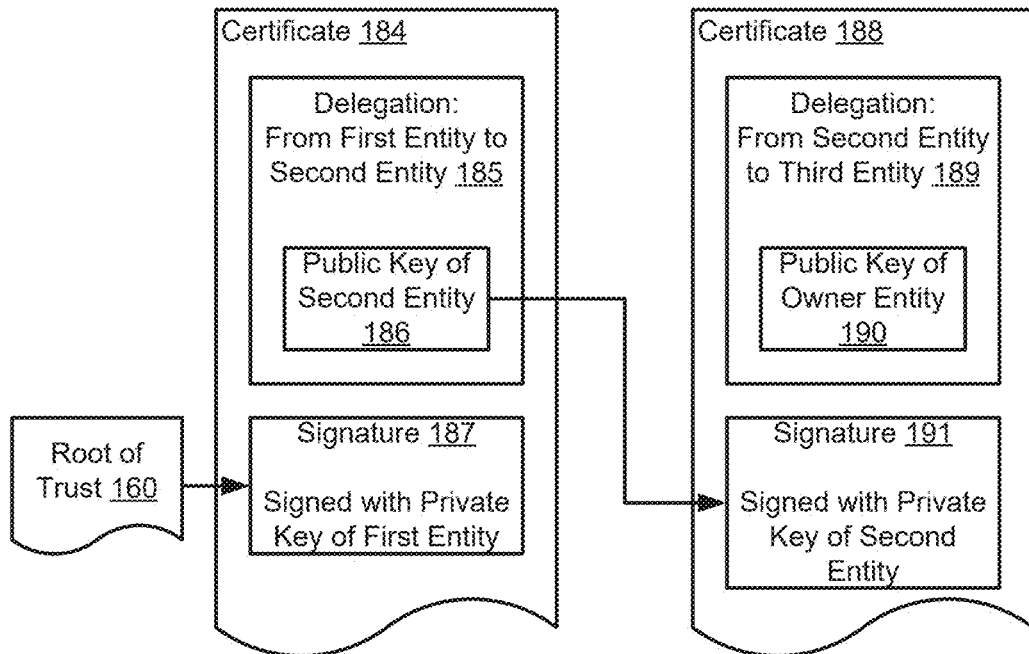
Figure 1H:
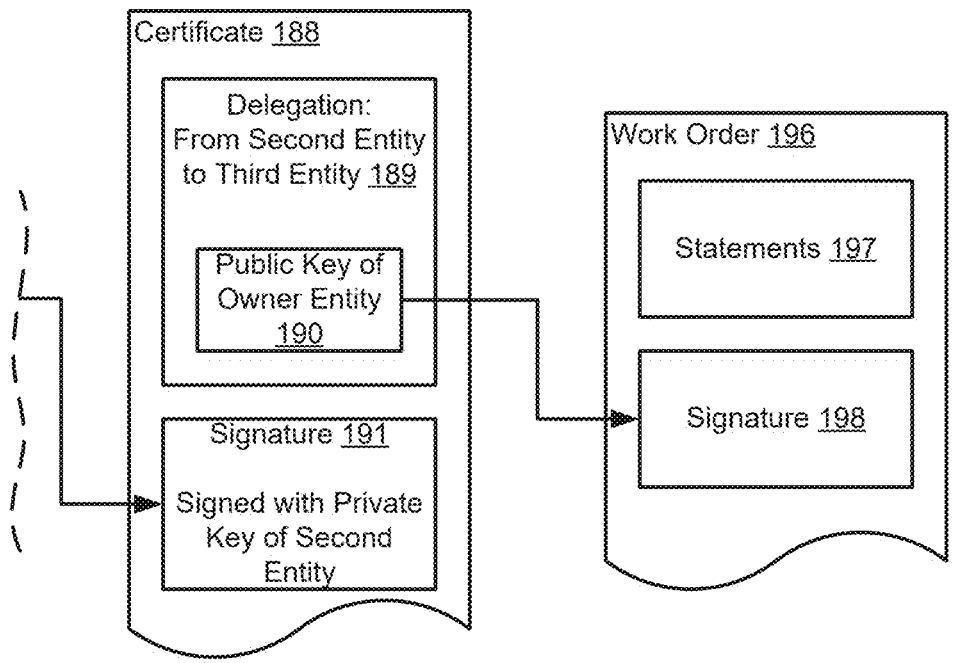

Private key 172 may be a private key of a public private key pair controlled by an entity that has authority over an endpoint device at the time authority over the endpoint device changes (e.g., via sale or other mechanism). In a scenario in which the manufacturer is the seller, the private key corresponding to the root of trust may be private key 172. Similarly, in a scenario in which an intermediate owner is the seller, private key 172 may be the private corresponding to the public key included in the delegation statement in ownership voucher 176 that establishes the intermediate owner has the owner of the endpoint device. In other words, to establish a delegation of authority, the entity that has authority over the endpoint device as defined by the certificates of ownership voucher 176 may need to sign the ownership transfer data 170 to further delegate ownership and authority over the endpoint device. By doing so, a chain of delegations that are cryptographically verifiable back to the root of trust may be established. Refer to FIGS. 1F-1H for additional details regarding establishing chains of delegations.

Any number of certificates may be added to ownership voucher 176 thereby enabling certificate chains that establish chains of delegation from the root of trust for an endpoint device. Ownership voucher 176 may, as discussed above, be used during onboarding.

Turning to FIG. 1E, a diagram of an example certificate 178 in accordance with an embodiment is shown. Certificate 178 may include delegation 179A and cryptographic data 179B.

Delegation 179A may include information documenting a delegation of authority/ownership over an endpoint device. For example, delegation 179A may include a public key, and indicate what is delegated to the entity that has control over the public private key pair of which the public key is a member. The extent of what is delegated may be specified at a macro level (e.g., ownership) or a micro level (e.g., limited authority).

Cryptographic data 179B may include signature usable to verify the integrity of delegation 179A and ascertain whether delegation 179A is valid.

To determine whether certificate 178 includes a valid delegation, an endpoint device may attempt to establish a chain of delegations back to the root of trust.

Turning to FIG. 1F, a diagram of an example certificate chain 182 of ownership voucher 176 in accordance with an embodiment is shown. Certificate chain 182 may be a series of certificates that can be sequentially validated back to the root of trust. To sequentially validate the certificate back to the root of trust, the first certificate (e.g., 178) in the chain may attempt to be validated using the root of trust (e.g., a public key). Thus, the first certificate in the chain may only be validated if the private key (e.g., controlled by the manufacturer) corresponding to the root of trust was used to sign certificate 178. Other certificates in the chain may be similarly validated by using the public key from the delegation statement of the previous certificate to check the signature in the next certificate in the chain. Certificate chain 182 may include any number of certificates (e.g., 178-180) that can be sequentially verified back to the root of trust.

Refer to FIGS. 1G-1H for additional information regarding establishing valid certificate chains.

Turning to FIG. 1G, a diagram of an example process for validating a portion of a certificate chain of an ownership voucher in accordance with an embodiment is shown. In FIG. 1G, two certificates (e.g., 184, 188) from a certificate chain are shown.

As seen, certificate 184 may include delegation 185 which includes a public key (e.g., 186) of a second entity. The delegation statement may indicate that a first entity is delegating authority to the second entity.

Certificate 184 may include signature 187. Signature 187 may be generated using a private key controlled by the first entity that delegated authority to the second entity. In this example, the private key may correspond to root of trust 160 (e.g., may be a private corresponding to the public key installed when an endpoint device is manufactured).

To establish a certificate chain, signature 187 may be checked using root of trust 160. If verified as having been signed using the private key corresponding to the root of trust, then certificate 184 may be treated as being valid.

Like certificate 184, certificate 188 may include delegation 189 which includes a public key (e.g., 190) of a third entity, and in this example the owner. The delegation statement of delegation 189 may indicate that the second entity is delegating authority to the third entity (i.e., the owner).

Certificate 188 may include signature 191. Signature 91 may be generated using a private key controlled by the second entity that delegated authority to the third entity. In this example, the private key may correspond to the public key (e.g., 186) of the second entity which may be included in delegation 185.

To extend the certificate chain, signature 191 may be checked using public key of second entity 186. If verified as having been signed using the private key corresponding to public key of second entity 186, then certificate 188 may be treated as being valid.

Once the chain is established, the delegations (e.g., 185, 189) in the chain may be parsed to identify keys to which authority has been delegated from root of trust 160. These public key may then be used to decide whether various work orders are valid, which entities have authority of an endpoint device, and/or for other purposes.

For example, during onboarding, an endpoint device may evaluate whether to perform various work orders using the keys to which authority has been delegated.

Turning to FIG. 1H, a diagram of an example process for validating a work order in accordance with an embodiment is shown. In FIG. 1H, only a portion of the certificates (e.g., 184, 188) shown in FIG. 1G are shown for clarity.

When a work order (e.g., 196) is received by an endpoint device, the endpoint device may evaluate whether the entity issuing the work order has authority over the endpoint device. To do so, the endpoint device may parse the certificates to identify the public keys to which authority over the endpoint device has been delegated.

The endpoint device may then, using the keys, check a signature (e.g., 198) included in the work order. If the signature can be verified as having been generated using the private key corresponding to one of the public keys to which authority over the endpoint device has been delegated, then the endpoint device may treat work order 196 as having been issued by an entity with authority over it. For example, signature 198 may be checked using public key of owner entity 190, in this example.

The endpoint device may then, for example, process various statements 197 included in work order 196, and take action based on those statements. These statements may include instructions that change the manner of operation of the endpoint device to, for example, comply with security requirements of a new owner, and/or perform other actions.

However, in some cases, orchestrators or other entities may lack access to the private key to which public key of owner entity 190 and/or other public keys in the certificate chains delegate authority over the endpoint device. Thus, the orchestrators may lack the ability to generate work orders that may be validated by the endpoint devices using information from ownership vouchers.

Figure 1I:

For example, turning to FIG. 1I which shows a diagram in accordance with an embodiment, signed data 204 such as a work order may be validated if public keys included in ownership voucher certificate chains (e.g., 202) correspond to private keys to which the work order issuing entity (e.g., the orchestrator 132, the manufacturer system 100, or any other computing device connected to an endpoint device (that is being onboarded) through communication system 140) has access. In this example, ownership voucher certificate chain 202 may be used to establish delegations of authority from root of trust 200 for an endpoint device to the keys used to sign signed data 204.

Figure 1J:
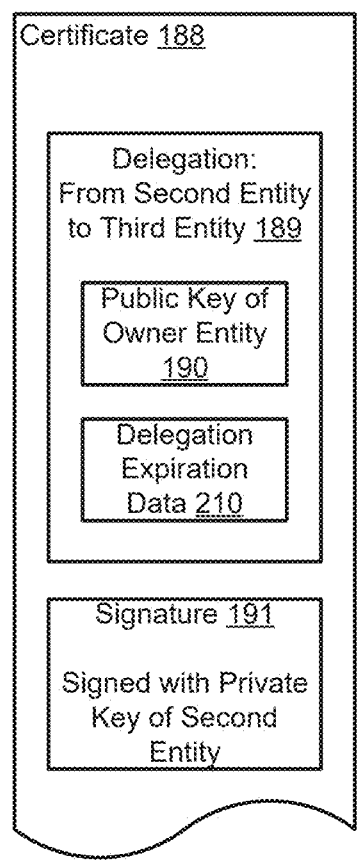

Turning now to FIG. 1J, assume in the stream of commerce scenario discussed above in reference to FIG. 1B that the final owner (e.g., at the final owner facility) is provided with only temporary authority and/or ownership of the endpoint device 103. For example, the owner directly before the final owner may lending, leasing, providing the endpoint device 103 as part of the subscription service, or the like to the final owner in sense where control over the endpoint device 103 is relinquished to the final owner but full ownership of the endpoint device 103 is not. To convey such temporary delegation of authority, the owner directly before the final owner may include delegation expiration data 210 in a certificate (e.g., 188).

In particular, FIG. 1J shows an example of certificate 188 (e.g., FIG. 1H) where such a delegation expiration data 210 is included. The delegation expiration data 210 may be included in the delegation statement of delegation 189 included in certificate 188. Namely, in addition to the public key of the owner entity 190 (e.g., the public key of the public private key pair of the entity that will be in (direct, or indirect through a corporation, business, or the like of the entity) physical possession of the endpoint device 136), the delegation 189 may also include the delegation expiration data 210.

In embodiments, the delegation expiration data 210 may include: (i) a statement indicating that the delegation of authority is temporary; (ii) clear and concise (e.g., non-ambiguous and finite) expiration information (e.g., an exact date, time, year, or any combination thereof presenting as a single date/time/year combination, as a period of time, or the like) indicating when the temporary delegation of authority is set to expire; (iii) an indication (e.g., a statement or the like) specifying that control over the endpoint device cannot be further conveyed (e.g., via a sub-lease, second-hand lending, resale/rental of subscription, or the like) past the expiration information included in (ii); (iv) an indication (e.g., a statement or the like) specifying that the current entity receiving the temporary delegation of authority cannot convey (e.g., via a non-temporary, permanent delegation of authority) full ownership of the endpoint device to another entity; (v) and any other relevant and/or similar information to reinforce that the delegation of authority is temporary. An entity or computing device having access to such delegation expiration data 210 will then be able to easily determine when temporary delegation of authority will become void (e.g., at the end of the time, such as 11:00 PM Eastern time on Jul. 16, 2024, specified as part of the expiration information included in delegation expiration data 210).

Inclusion of such delegation expiration data 210 in a certificate (e.g., 188) advantageously allows a current owner (e.g., temporary or permanent) of an endpoint device (e.g., 130) to convey control over the endpoint device to another entity (e.g., someone lending or leasing the device from the current owner, or the like) without giving up ownership of the endpoint device to that other entity.

To further clarify embodiments disclosed herein, data flow and interactions diagrams and implementation examples in accordance with an embodiment are shown in FIGS. 2A-2D. These data flow and interactions diagrams and implementation examples may illustrate how data may be obtained and used within the system of FIGS. 1A-1J.

Figure 2A:
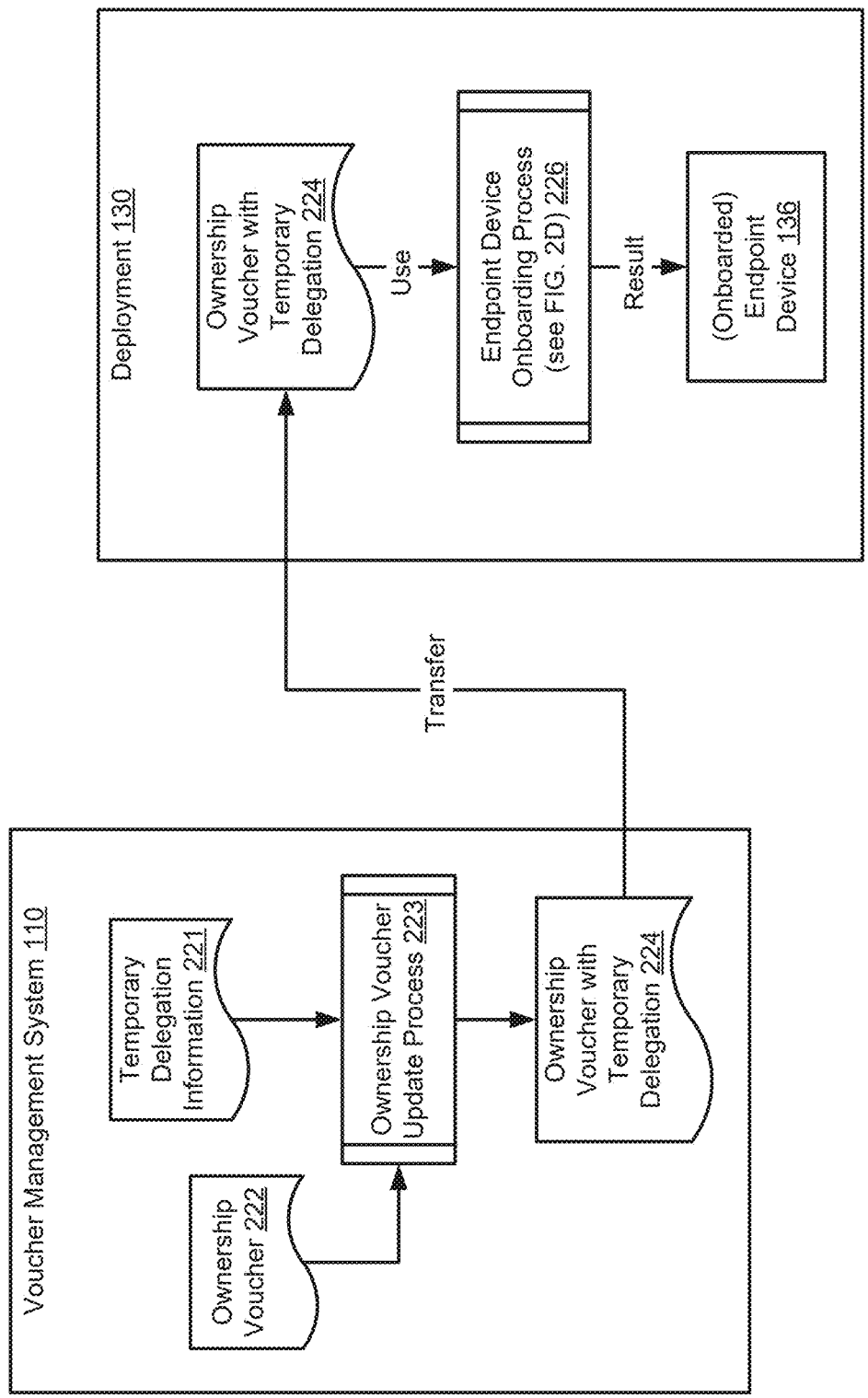
FIG. 2A shows a data flow diagram in accordance with an embodiment.

Starting with the data flow diagram of FIG. 2A, flows of data and processing of data are illustrated using different sets of shapes. A first set of shapes (e.g., 222, 221, 224, etc.) is used to represent data structures (e.g., files, data packets, or the like), a second set of shapes (e.g., 223, 226, etc.) is used to represent processes performed using and/or that generate data, and a third set of shapes (e.g., 110, 130, 136, etc.) is used to represent the components (e.g., the devices, hardware and/or software components, or the like discussed above in reference to FIGS. 1A-1J) that perform the processes shown using the second set of shapes.

As shown in FIG. 2A, voucher management system 110 (or manufacturer system 100 of FIG. 1A, or the like) may obtain temporary delegation information 221 and an ownership voucher 222.

The temporary delegation information 221 may include delegation expiration data (e.g., 210 of FIG. 1J) and may be obtained from a current owner of an endpoint device (e.g., 136) that is still within the stream of commerce (e.g., FIG. 1B). The ownership voucher 222 may be associated with the endpoint device 136 may include information indicating the endpoint device's 136 journey (e.g., how many times the endpoint device 136 has changed hands, or the like) within the stream of commerce. Similar to ownership voucher 176 discussed above in reference to FIG. 1F, ownership voucher 222 may also include a certificate chain 182 documenting this journey.

As further shown in FIG. 2A, ownership voucher 222 (for endpoint device 136) and the temporary delegation information 221 may be ingested by ownership voucher update process 223 being performed by the voucher management system 110. As part of the ownership voucher update process 223, the voucher management system 110 adds a new certificate including the delegation expiration data (e.g., example certificate 188 of FIG. 1J) to the ownership voucher 222 to produce (e.g., obtain) ownership voucher with temporary delegation 224.

In embodiments, as part of adding the new certificate, the voucher management system 110 (or another computing device) may also generate or obtain a new public private key pair for the new entity onto which the temporary delegation of authority is to be conveyed. The public private key pair may be distributed to (or be obtained from) this new entity.

Additionally, if the voucher management system 110 has access to the public private key pair of the new entity onto which the temporary delegation of authority is to be conveyed, the voucher management system 110 may (optionally as part of ownership voucher update process 223) validate whether the temporary delegation of authority is valid (e.g., using the cryptographic validation method back to the root of trust as discussed above in reference to FIGS. 1C-1I). However, such validation by the voucher management system 110 is not necessary before the voucher management system 110 provides the ownership voucher with temporary delegation 224 to an endpoint device (e.g., 136) at a deployment (e.g., 130).

Said another way, because the ownership voucher (namely, every entry and/or extension of the ownership voucher) is cryptographically signed, any device (e.g., the ultimate endpoint device 136 receiving the ownership voucher, or the like) besides the voucher management system 110 may advantageously determine, in a secured manner, that the delegations within the ownership voucher are secure and valid without having to rely on the voucher management system 110. Namely, in one example of embodiments disclosed herein, the ultimate endpoint device (e.g., 136 of FIG. 2A) receiving the ownership voucher with temporary delegation 224 may be the first device (and/or entity) to validate the temporary delegation of authority included in the ownership voucher with temporary delegation 224.

In particular, as shown in FIG. 2A, after the ownership voucher with temporary delegation 224 is generated, the ownership voucher with temporary delegation 224 is transferred by the voucher management system 110 to deployment 130 at which endpoint device 136 (e.g., the endpoint device associated with the ownership voucher with temporary delegation 224) is to be onboarded.

Upon receipt of the ownership voucher with temporary delegation 224, the ownership voucher with temporary delegation 224 is used in an endpoint device onboarding process 226 (discussed in more detail in reference to FIG. 2D) to complete an onboarding process for endpoint device 136. Once successfully onboarded using the ownership voucher with temporary delegation 224, an onboarded endpoint device 136 may be obtained at deployment 130.

Any of the processes illustrated using the second set of shapes (shown in FIG. 2A) may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Figure 2B:
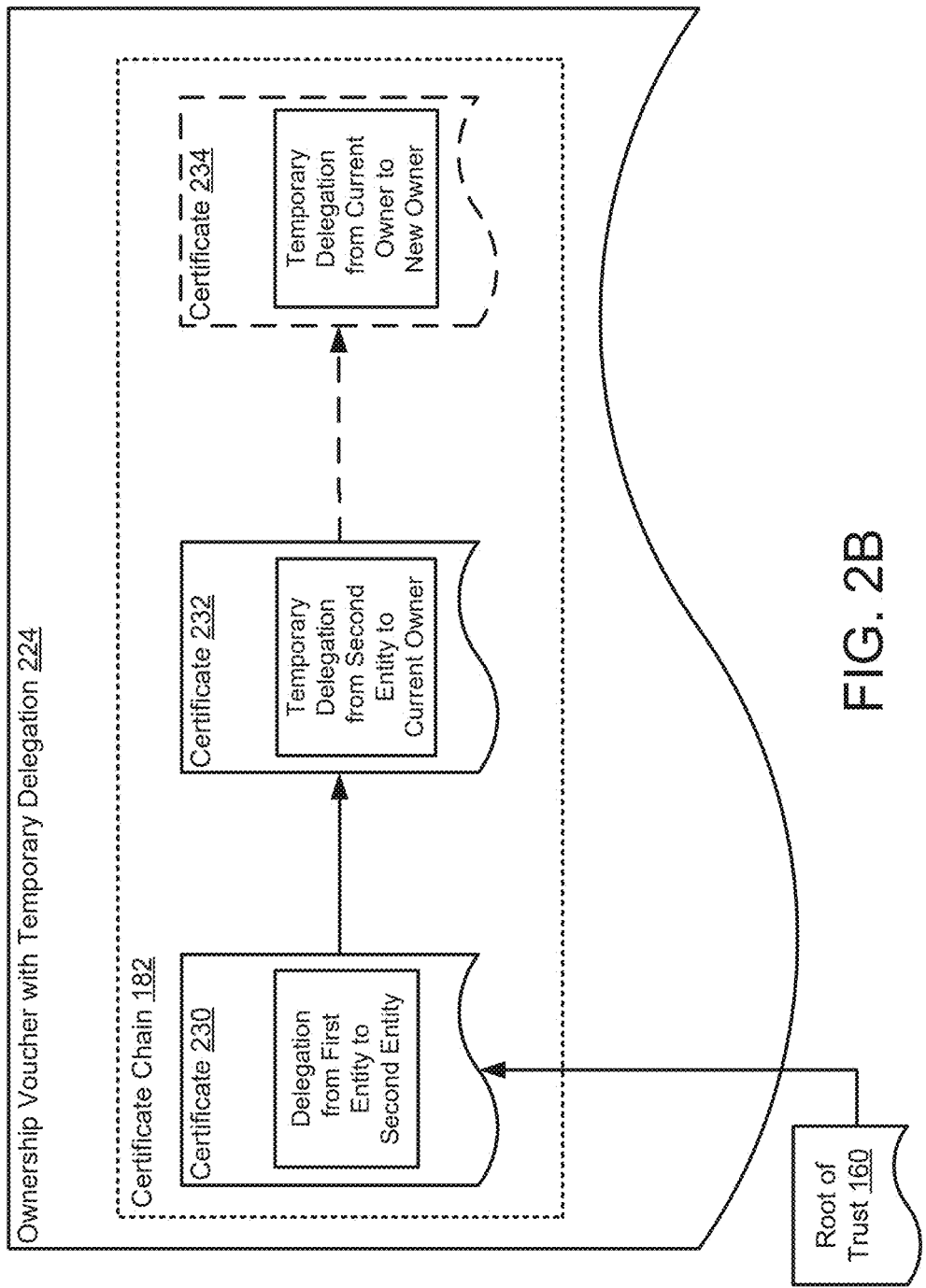
FIGS. 2B-2C show implementation examples in accordance with an embodiment.

Turning now to FIG. 2B, a first implementation example of embodiments disclosed herein is shown. The first implementation example shows an example of the ownership voucher with temporary delegation 224 discussed in FIG. 2A.

As shown in FIG. 2B, the example ownership voucher with temporary delegation 224 may include certificate chain 182 (e.g., FIG. 1F) including three certificates 230, 232, 234. Each of these certificates 230, 232, 234 may be similar to any of the certificates discussed above in reference to FIGS. 1D-1I.

As also shown in FIG. 2B, certificate 230 is the first certificate included in the certificate chain and can be verified using the root of trust 160 (e.g., FIG. 1G) stored in an endpoint device. Certificate 230 also includes a delegation (e.g., permanent delegation) from a first entity to a second entity. Essentially, certificate 230 is substantially identical to certificate 184 shown in FIG. 1G.

Certificate 232 now includes a temporary delegation from the second entity to a current owner (e.g., a third entity). Essentially, certificate 232 is substantially identical to certificate 188 of FIG. 1J that contains the delegation expiration data 210. In this example, certificate 232 shows a first temporary conveyance of authority (e.g., an original, first lease or the like) from the first to the second entity.

In embodiments, the example ownership voucher with temporary delegation 224 may also (optionally) include yet another certificate 234 that includes another (e.g., a second) temporary delegation. This time, the temporary delegation in certificate 234 is from the current owner (who received temporary delegation of authority from the second entity) to a new owner. Such a second temporary delegation may happen, for example, when the new owner is sub-leasing (or through other similar situations of temporary conveyance of control) the endpoint device from the current owner.

The certificate 234 may also be substantially identical to certificate 188 of FIG. 1J that contains the delegation expiration data 210. However, the delegation expiration data information included in certificate 234 may be different from the delegation expiration data included in certificate 234. In embodiments, for the second temporary delegation using certificate 234 to be valid, the expiration information included in the delegation expiration data in certificate 234 cannot specify a time or period that extends past the expiration information included in the delegation expiration data in certificate 232.

For example, assume certificate 232 specifies that the first temporary delegation expires at 11:59 PM on Jul. 16, 2024, and that an endpoint device validating the certificates is performing the validation (e.g., as part of its onboarding process) on Jul. 1, 2024. For the second temporary delegation to be valid, certificate 234 must specify (e.g., as part of the expiration information) a time and date that: (i) is not before Jul. 1, 2024 (e.g., that has not already expired); and (ii) does not exceed 11:59 PM on Jul. 16, 2024 (e.g., that does not exceed the expiration information of a first certificate within the chain to convey temporary delegation). In particular, as a first example, an expiration information specifying an expiration of 00:01 AM on Jul. 17, 2024, would render the second temporary delegation invalid while an expiration information specifying an expiration of 11:58 PM on Jul. 16, 2024, would render the second temporary delegation invalid.

Said another way, a first temporary delegation (e.g., a first lease, or the like) in certificate 232 is valid as long as the temporary conveyance has not expired yet, and any subsequent temporary delegations (e.g., any subsequent sub-leases, or the like) are valid if: (i) they have not expired; and (ii) do not extend beyond the expiration of the first lease (e.g., does not exceed the bounds of the first expiration information of the first lease).

Should an endpoint device determine (e.g., based on the above validation process) that the second temporary delegation is invalid, the endpoint device may terminate the onboarding process without completing the onboarding process. The endpoint device that has terminated its onboarding process without completing the onboarding process may become an onboarding-failed endpoint device that is unable to provide computer-implemented services to a current entity (e.g., the sub-lessee) with physical possession of the device. Said another way, if the second temporary delegation is invalid, the endpoint device will determine that the current entity (e.g., the sub-lessee) trying to onboard the endpoint device has no authority to do so and will cause itself to shut off and become the onboarding-failed endpoint device such that the current entity tying to onboard the endpoint device is unable to use to endpoint device.

Similarly, if the endpoint device were to detect (e.g., while validating the certificate chain 182 back to the root of trust 160) that any of the other certificates 230 or 232 are invalid (presuming that certificate 234 has been deemed valid), the endpoint device will cause itself to shut off and become the onboarding-failed endpoint device.

Figure 2C:
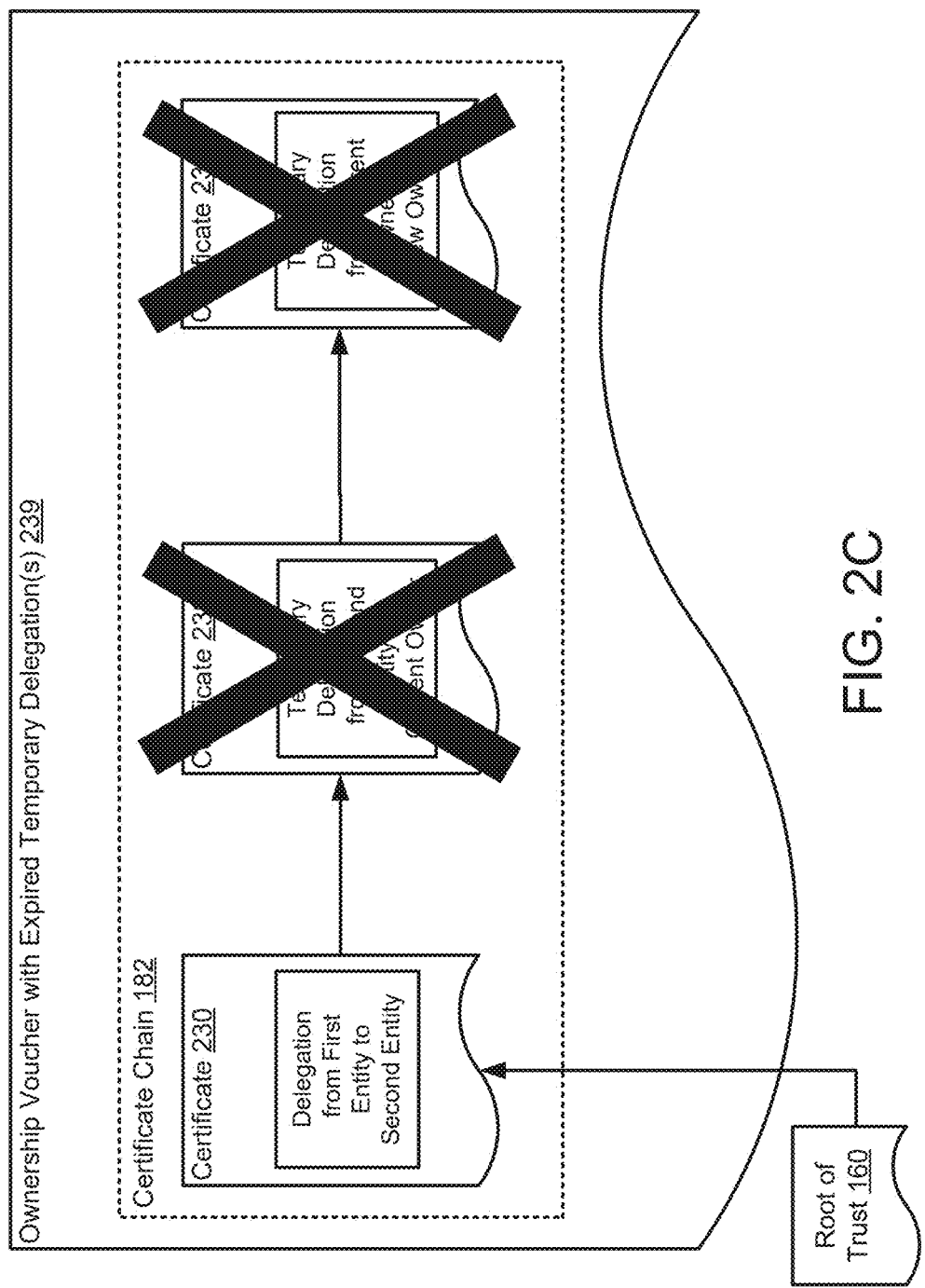

Turning now to FIG. 2C, a second implementation example of embodiments disclosed herein is shown. The second implementation example shows an example of an ownership voucher with expired temporary delegation(s) 239. The ownership voucher with expired temporary delegation(s) 239 may include the same (but expired) certificates as those included in the example ownership voucher with temporary delegation 224 of FIG. 2B. The expired certificates are marked with the large "X"s shown in FIG. 2C.

As shown in FIG. 2C, once the expiration date and/or period specified in the expiration information of certificates 232 and 234 have expired, certificates 232 and 234 may become void. Thus, if the entities specified in the temporary delegations of certificates 232 and 234 (e.g., the lessee and sub-lessee, or the like) were to try onboard the endpoint device associated with ownership voucher with expired temporary delegation(s) 239, the onboarding will fail and the endpoint device will cause itself to become the onboarding-failed endpoint device.

However, the second entity who received permanent ownership from the first entity through certificate 230 may still be able to successfully onboard the endpoint device (assuming that the second entity has possession of the second entity's private key, from the second entity's public private key pair, that can be used to successfully validate the delegation (e.g., delegation 185 of FIG. 1G) included in the certificate 230). Namely, if any onboarding related work orders issued by the second entity (e.g., via an orchestrator belonging to the second entity or the like) is signed by the private key of the second entity that pairs with the public key of the second entity that is included in the delegation of certificate 230).

In embodiments, any expired certificates (e.g., 232 and 234 in FIG. 2C) may be kept in the ownership voucher (namely, to show a clear delegation record, for delegation and conveyance tracking purposes, or the like). Alternatively, the voucher management system 110 may purge (e.g., delete) any expired certificates (e.g., 232 and 234 in FIG. 2C) from an ownership voucher.

In embodiments, endpoint devices may be configured to store all ownership vouchers. Alternatively, endpoint devices may be configured to store only ownership vouchers determined to contain certificates with temporary delegation(s) of authority. In particular, this allows the endpoint device to subsequently determine when the temporary delegation of authority has ended (e.g., when the lease, rental, or subscription period as ended) so that the endpoint device can halt (e.g., stop providing computer-implemented services associated with) any and all functions and/or components associated with the temporary delegation(s) of authority. Said another way, the endpoint device may effectively become an un-boarded endpoint device (e.g., an endpoint device that has not been onboarded) to the current entity.

In one example, if the lessor, rental owner, or subscription provider controls system software of the endpoint device (after the endpoint device is onboarded by a lessee, renter, or subscription receiver), the lessor, rental owner, or subscription provider may (through control of the software system): (i) seize to operate the endpoint device; (ii) provide warnings of the expiration of the temporary delegation of authority; (iii) allow a grace period; (iv) do nothing at all; (v) or the like.

In another example, if the lessor, rental owner, or subscription provider yields control over most bare metal functionalities of the endpoint device but the endpoint device was onboarded using another device or component (installed within the endpoint device) that the lessor, rental owner, or subscription provider has control over (e.g., an out-of-band (OOB) processor, a baseboard management controller (BMC), or the like), the lessor, rental owner, or subscription provider may cause that device or component to disable operations of the endpoint device upon expiration of the temporary delegation of authority.

Additionally, should an entity wish to amend or extend a temporary delegation of authority, the entity may utilize ownership voucher update process 223 of FIG. 2A (after providing the necessary amendment and/or extension information in the temporary delegation information 221) to make such amendments or extensions. The voucher management system 110 may reissue any amended or newly generated ownership vouchers including the amended or extended temporary delegation to the appropriate deployment containing the endpoint device associated with the amended or newly generated ownership vouchers.

Figure 2D:
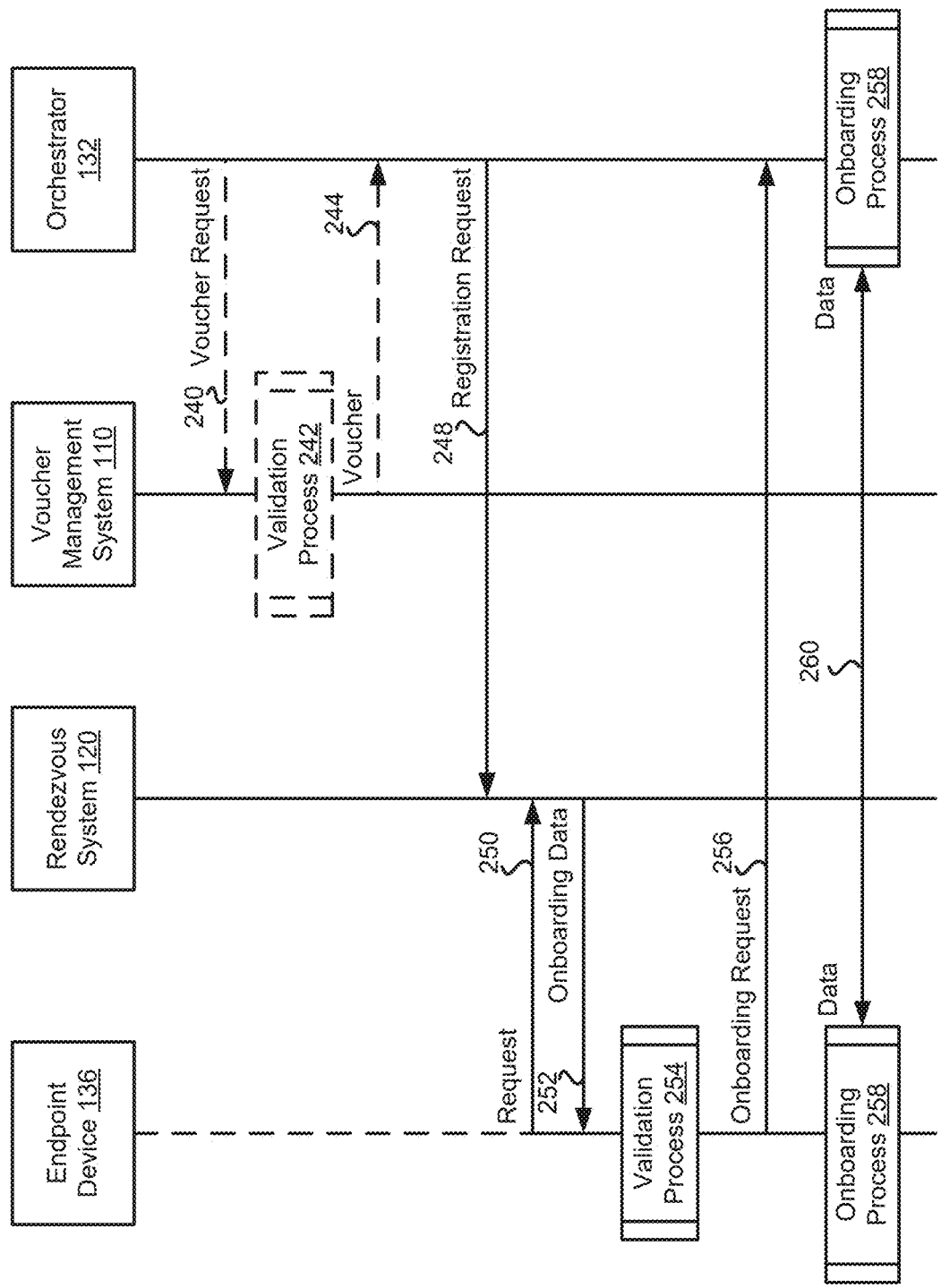
FIG. 2D shows an interaction diagram in accordance with an embodiment.

Turning now to FIG. 2D, FIG. 2D shows an interaction diagram illustrating an example onboarding process of the endpoint device (e.g., the onboarded endpoint device 136 of FIG. 2A).

In the interaction diagram of FIG. 2D, processes performed by and interactions between components of a system in accordance with an embodiment are shown. In the diagrams, components of the system are illustrated using a first set of shapes (e.g., 110, 120, 132, 136, etc.), located towards the top of each figure. Lines descend from these shapes. Some descending lines are drawn in dashing to indicate that the device is not operating during corresponding periods of time, while other lines are drawn solid to indicate that the devices are operating during the corresponding period of time. For example, in FIG. 2A, endpoint device 136 may not be operating until interaction 250.

Processes performed by the components of the system are illustrated using a second set of shapes (e.g., 242, 246, etc.) superimposed over these lines. Interactions (e.g., communication, data transmissions, etc.) between the components of the system are illustrated using a third set of shapes (e.g., 240, 244, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 240 may occur prior to the interaction labeled as 244. However, it will be appreciated that the processes and interactions may be performed in different orders, any may be omitted, and other processes or interactions may be performed without departing from embodiments disclosed herein. Broken lines shown in FIG. 2D represent optional processes, interactions, and/or steps.

As shown in FIG. 2D, to onboard endpoint device 136, orchestrator 132 may, at interaction 240, send a voucher request to voucher management system 110. The voucher request may be a request for an ownership voucher for an endpoint device (e.g., 136). In the example interactions shown in FIG. 2A, an entity may have purchased endpoint device 136 thereby causing voucher management system 110 to add information to the ownership voucher for endpoint device 136 that establishes chains of certificates/delegations from the root of trust to the owner.

When received, voucher management system 110 may attempt to validate the voucher request by performing validation process 242. During validation process, credentials and/or other information from orchestrator 132 may be evaluated to ascertain whether an ownership voucher should be provided (e.g., determining whether the orchestrator 132 has the private key to which the ownership voucher delegates authority over endpoint device 136).

Presuming that the validation process is successful, at interaction 244, voucher management system 110 may send an ownership voucher to orchestrator 132.

In embodiments, interactions 240 and 244 and process 242 may be skipped. For example, the orchestrator 132 may be directly provided with the ownership voucher by an entity with full ownership of an endpoint device that wishes to convey only control (but not ownership) to another entity.

Once the ownership voucher is obtained by orchestrator 132, at interaction 248, orchestrator 132 may send a registration request to rendezvous system 120. The registration request may be a request to have rendezvous system 120 redirect endpoint device 136 to orchestrator 132. The registration request may include information usable by rendezvous system 120 to verify that orchestrator 132 should have authority over endpoint device 136.

Once endpoint device 136 reaches a destination location (e.g., a data center, edge deployment, etc.), endpoint device 136 may be powered on and may, at interaction 250, send a request to rendezvous system 120 regarding which entity to contact as part of an onboarding procedure.

Presuming the rendezvous system 120 registered orchestrator 132 based on the registration request, rendezvous system may, at interaction 252, provide onboarding data to endpoint device 136. The onboarding data may include, for example, various validation information and re-direct information (e.g., network address) for orchestrator 132.

Once obtained, endpoint device 136 may perform validation process 254. During validation process 254, endpoint device 136 may attempt to validate the onboarding data. If successfully validated, endpoint device 136 may, at interaction 256, generate and send an onboarding request to orchestrator 132. The onboarding request may request, for example, cryptographic data such as ownership vouchers. The request may initiate a cooperatively performed onboarding process 258, at interaction 260, by endpoint device 136 and orchestrator 132.

During onboarding process 258, orchestrator 132 may provide endpoint device 136 with the ownership voucher and/or other information to enable endpoint device 136 to ascertain whether orchestrator 132 has authority over endpoint device 136. To do so, endpoint device 136 may, as discussed above, attempt to validate certificate chains and delegation statements to establish a chain of delegation of authority from the root of trust to orchestrator 132 (e.g., the delegation statements may identify a particular public key for which orchestrator 132 controls a corresponding private key). Endpoint device 136 may issue various challenges (e.g., signing challenges) to orchestrator 132, and endpoint device 136 may test the signed responses to the challenges using the particular public key. If the signed responses can be validated using the public key, then endpoint device 136 may conclude that orchestrator 132 has authority over it.

If successfully validated as having authority over it, endpoint device 136 may continue to participate in the onboarding by, for example, evaluating the trustworthiness of signed work orders issued by orchestrator 132, and complying with any signed work orders that can be validated as having been signed with the private key corresponding to the particular public key.

In embodiments, the validation performed during onboarding process 258 involves validating all delegations (e.g., permanent or temporary) of authority included in the ownership voucher (e.g., via the certificate chain included in the ownership voucher) back to a root of trust (e.g., 160, FIG. 1C) stored in the endpoint device 136. The temporary delegations of authority are validated, as discussed above in reference to FIG. 2B, using the delegation expiration data 210 (e.g., FIG. 1J) included in certificates that include the temporary delegations of authority.

In particular, if the ownership voucher includes only a single certificate containing a temporary delegation of authority, the endpoint device 136 will have to first determine that: (i) this temporary delegation of authority (e.g., using the delegation expiration data 210) is not expired; and (ii) that the certificate containing this temporary delegation of authority is (temporally) the last certificate in the certificate chain). If either of these determinations fail, the endpoint device 136 will stop onboarding process 258 and become an onboarding-failed endpoint device. Alternatively, if both of these determinations pass, the endpoint device 136 will still have to cryptographically validate the certificate chain back to the root of trust. If the validation back to the root of trust succeeds, the endpoint device 136 will perform one or more actions to complete its onboarding. If the validation back to the root of trust fails, the endpoint device 136 will stop onboarding process 258 and become an onboarding-failed endpoint device.

In another example where the ownership voucher includes multiple certificates containing the temporary delegation of authority, before validating the certificate chain back to the root of trust, the endpoint device 136 will first have to determine that: (i) none of the certificates containing the temporary delegation of authority come before a certificate conveying permanent delegation of authority (namely that a lessee, renter, or subscription holder has not conveyed full ownership of the endpoint device to another entity); (ii) none of the certificates containing the temporary delegation (starting from the last certificate in the certificate chain) of authority have expired; and (iii) none of the later certificates containing the temporary delegation of authority include expiration information that exceeds the bounds of expiration information in the first certificate within certificate chain having the first temporary delegation of authority (namely, that a lessee, renter, or subscription holder has not provided another entity with control beyond the period they themselves have been given control over the endpoint device; said another way, a sub-lease or the like cannot expire after the lease from which the sub-lease is based). If any of these determinations fail, the endpoint device 136 will stop onboarding process 258 and become an onboarding-failed endpoint device. Only once all of these determinations have passed that the endpoint device 136 will then begin cryptographically validating the certificate chain back to the root of trust.

The aforementioned work orders may cause endpoint device 136 to, for example, modify its configuration, install/remove software, enable/disable various hardware components, establish accounts for end users, apply all licenses (e.g., component licenses) the endpoint device identifies within the ownership voucher and/or perform other operations as directed by orchestrator 132. The aforementioned operations may place endpoint device 136 in an operating state specified by the owner of endpoint device 136.

Any of the processes illustrated using the second set of shapes and interactions illustrated using the third set of shapes in FIG. 2B may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes in FIG. 2B may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions shown in FIGS. 2A-2B may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3:
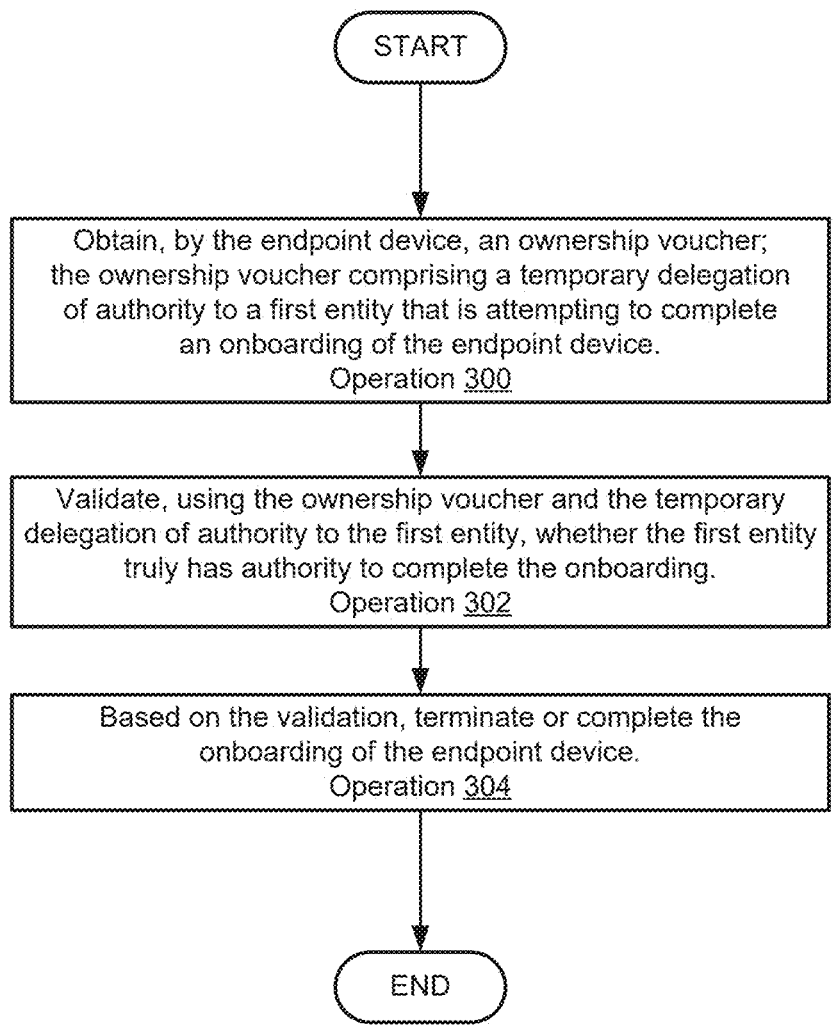
FIG. 3 shows a flow diagram illustrating a method in accordance with an embodiment.

As discussed above, the components of FIG. 1A may perform various methods to onboarding endpoint devices. FIG. 3 illustrates a method that may be performed by the components of the system of FIGS. 1A-1J. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for performing an onboarding in accordance with an embodiment is shown. The method may be performed by any of the components of the system shown in FIG. 1A.

For example, the method may be performed by an endpoint device after the endpoint device has been first plugged-in and powered on after being removed from a box in which the endpoint device was shipped to a current (e.g., final) owner facility (e.g., 154, FIG. 1B). Upon being first powered on, the endpoint device may initiate (e.g., start) an onboarding process (e.g., a late-bound ZTSP process) including the following operations 300-304.

In particular, at Operation 300, and as discussed above in reference to FIGS. 1A-1J and 2A-2B, an endpoint device may, while it is being onboarded after first being plugged-in and powered on, may obtain an ownership voucher.

In embodiments, as discussed above in reference to FIG. 1J and FIGS. 2A-2D, the ownership voucher may include a temporary delegation of authority to a first entity that is attempting to complete an onboarding of the endpoint device.

In Operation 302, and as discussed above in reference to FIGS. 1D-1I and FIGS. 2A-2D, the endpoint device may use the ownership voucher and the temporary delegation of authority to the first entity to validate whether the first entity truly has authority to complete the onboarding of the endpoint device.

In Operation 304, and as discussed above in reference to FIGS. 1D-1I and FIGS. 2A-2D, based on the validation in Operation 302, the endpoint device may terminate (and become an onboarding-failed endpoint device) or complete (and become an onboarded endpoint device) the onboarding.

The process of FIG. 3 may end following Operation 304.

Figure 4:
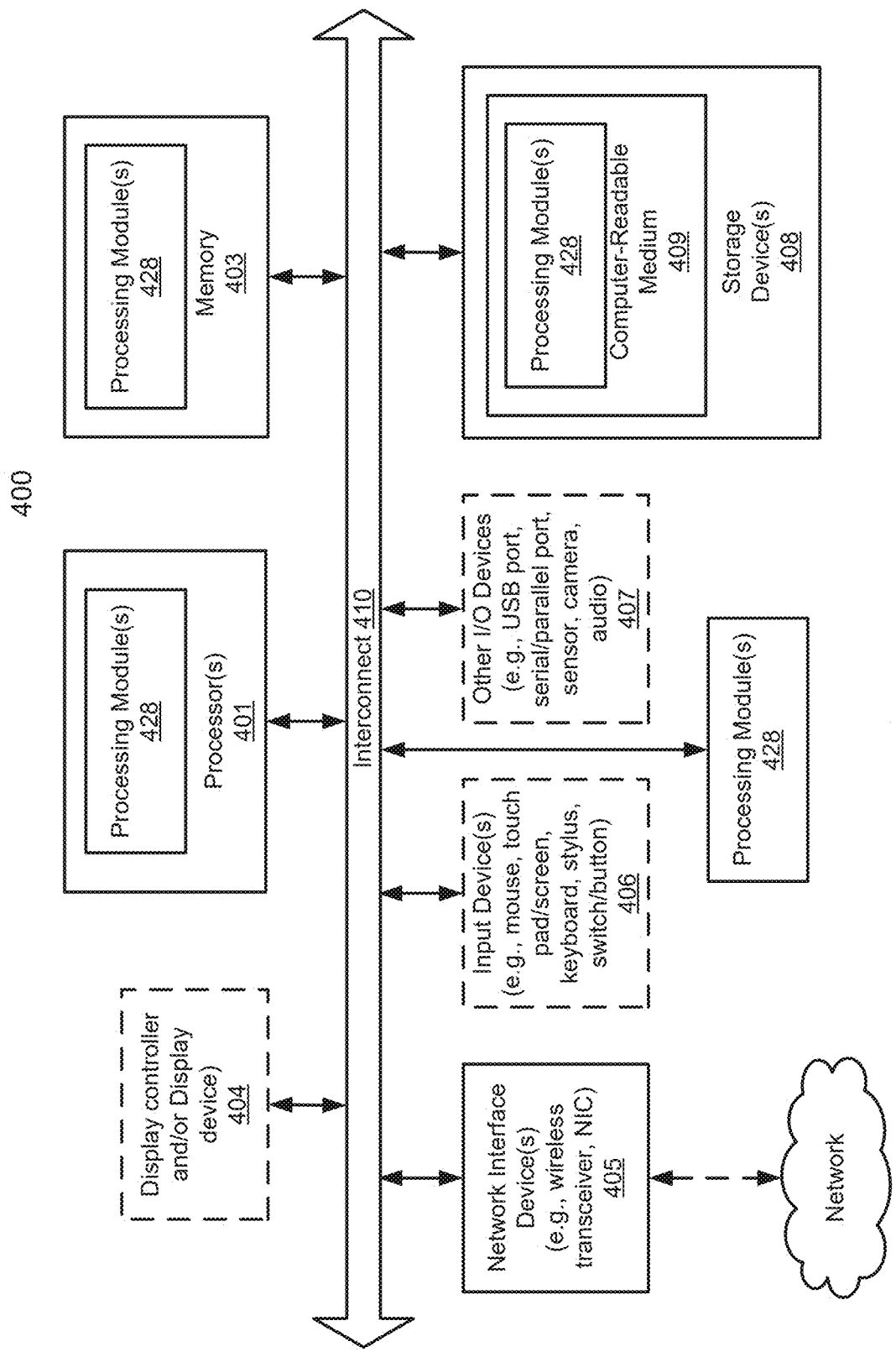
FIG. 4 shows a block diagram illustrating a data processing system in accordance with an embodiment.

Any of the components illustrated in FIGS. 1A-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems (OSs), device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing endpoint devices, the method comprising:
    during an onboarding of an endpoint device of the endpoint devices and by the endpoint device:
        obtaining an ownership voucher, the ownership voucher comprising a temporary delegation of authority to a first entity, the first entity attempting to complete the onboarding of the endpoint device;
        validating, using the ownership voucher and the temporary delegation of authority to the first entity, whether the first entity truly has authority to complete the onboarding by at least:
            making a first determination that the ownership voucher comprises the temporary delegation of authority to the first entity;
            making a second determination, in response to the first determination, as to whether the temporary delegation of authority has expired;
            in a first instance of the second determination where the temporary delegation of authority has expired, terminating the onboarding of the endpoint device to obtain an onboarding-failed endpoint device;
            in a second instance of the second determination where the temporary delegation of authority has not expired, performing a first attempt to validate that the temporary delegation of authority to the first entity is valid; and
            in a first instance of the first attempt where the temporary delegation of authority to the first entity is validated as being valid, concluding that the first entity truly has the authority to complete the onboarding; and
        based on the validating, terminating or completing the onboarding of the endpoint device by at least:
            performing one or more actions to complete the onboarding of the endpoint device based on concluding that the first entity truly has the authority to complete the onboarding.

2. The method of claim 1, wherein, prior to the onboarding being started and completed, the endpoint device is in a state that is unable to provide any computer-implemented services for any entity, including the first entity, in possession of the endpoint device.

3. The method of claim 2, wherein the state is a late-bounding state where the endpoint device, prior to the onboarding being started, is not provisioned with a host operating system (OS).

4. The method of claim 3, wherein
    the endpoint device is physically deployed to a deployment,
    the deployment comprising a control plane that comprises onboarding data for the onboarding of the endpoint device, and
    performing the one or more actions to complete the onboarding of the endpoint device comprises, at least:
        obtaining the onboarding data from the control plane; and
        using the onboarding data to complete the onboarding, the onboarding data comprising instructions and data for installing the host OS.

5. The method of claim 2, wherein the onboarding is part of a zero-touch secure provisioning (ZTSP) process, and the first entity attempting to complete the onboarding of the endpoint device has physical possession over the endpoint device.

6. The method of claim 2, wherein the ownership voucher comprises a certificate that:
    comprises the temporary delegation of authority to the first entity, the temporary delegation of authority comprising, at least:
        a public key of a public private key pair belonging to the first entity;
        delegation expiration data specifying expiration information at which the temporary delegation of authority to the first entity expires; and
    is cryptographically signed by a private key of a second entity that conveyed the temporary delegation of authority to the first entity, the private key being part of a public private key pair of the second entity.

7. The method of claim 6, wherein
    the ownership voucher further comprises a certificate chain comprising certificates, the certificate being one of the certificates, and
    performing the first attempt further comprises, as part of the first instance of the first attempt, making a third determination that the certificate chain can be cryptographically validated, starting at the certificate, back to a root of trust stored on the endpoint device.

8. The method of claim 7, wherein in a second instance of the first attempt where the temporary delegation of authority to the first entity is validated as being invalid, terminating the onboarding to obtain the onboarding-failed endpoint device.

9. The method of claim 2, wherein
    the temporary delegation of authority to the first entity is a first temporary delegation among two temporary delegations included in the ownership voucher, the first temporary delegation being temporally conveyed after a second temporary delegation of the two temporary delegations, and
    making the second determination further comprises making an extended second determination to determine whether the temporary delegation has expired and whether the first temporary delegation includes a first expiration information that exceeds a bounds of a second expiration information of the second temporary delegation.

10. The method of claim 9, wherein
    in a first instance of the extended second determination where the first temporary delegation has not expired and where the first expiration information has not exceeded the bounds of the second expiration information, performing the first attempt to validate that the first temporary delegation is valid, in a second instance of the extended second determination where the first temporary delegation has not expired and where the first expiration information has exceeded the bounds of the second expiration information, terminating the onboarding of the endpoint device to obtain the onboarding-failed endpoint device, and in a third instance of the extended second determination where the first temporary delegation has expired, terminating the onboarding of the endpoint device to obtain the onboarding-failed endpoint device.

11. The method of claim 1, wherein the temporary delegation of authority in the ownership voucher has not been previously validated by another entity or computing device before being validated by the endpoint device after a start of the onboarding of the endpoint device.

12. A non-transitory machine-readable medium having instructions stored therein, which when executed by a processor, cause the processor to perform operations for managing endpoint devices, the operations comprising:

during an onboarding of an endpoint device of the endpoint devices:

obtaining an ownership voucher, the ownership voucher comprising a temporary delegation of authority to a first entity, the first entity attempting to complete the onboarding of the endpoint device;

validating, using the ownership voucher and the temporary delegation of authority to the first entity, whether the first entity truly has authority to complete the onboarding by at least:

making a first determination that the ownership voucher comprises the temporary delegation of authority to the first entity;

making a second determination, in response to the first determination, as to whether the temporary delegation of authority has expired;

in a first instance of the second determination where the temporary delegation of authority has expired, terminating the onboarding of the endpoint device to obtain an onboarding-failed endpoint device;

in a second instance of the second determination where the temporary delegation of authority has not expired, performing a first attempt to validate that the temporary delegation of authority to the first entity is valid; and in a first instance of the first attempt where the temporary delegation of authority to the first entity is validated as being valid, concluding that the first entity truly has the authority to complete the onboarding; and based on the validating, terminating or completing the onboarding of the endpoint device by at least:

performing one or more actions to complete the onboarding of the endpoint device based on concluding that the first entity truly has the authority to complete the onboarding.

13. The non-transitory machine-readable medium of claim 12, wherein, prior to the onboarding being started and completed, the endpoint device is in a state that is unable to provide any computer-implemented services for any entity, including the first entity, in possession of the endpoint device.

14. The non-transitory machine-readable medium of claim 13, wherein the state is a late-bounding state where the endpoint device, prior to the onboarding being started, is not provisioned with a host operating system (OS).

15. The non-transitory machine-readable medium of claim 12, wherein the temporary delegation of authority in the ownership voucher has not been previously validated by another entity or computing device before being validated by the endpoint device after a start of the onboarding of the endpoint device.

16. An endpoint device, comprising:

a processor; and a memory coupled to the processor to store instructions, which when executed by the processor, cause the endpoint device to perform operations for onboarding, the operations comprising:

during an onboarding of the endpoint device:

obtaining an ownership voucher, the ownership voucher comprising a temporary delegation of authority to a first entity, the first entity attempting to complete the onboarding of the endpoint device;

validating, using the ownership voucher and the temporary delegation of authority to the first entity, whether the first entity truly has authority to complete the onboarding by at least:

making a first determination that the ownership voucher comprises the temporary delegation of authority to the first entity;

making a second determination, in response to the first determination, as to whether the temporary delegation of authority has expired;

in a first instance of the second determination where the temporary delegation of authority has expired, terminating the onboarding of the endpoint device to obtain an onboarding-failed endpoint device;

in a second instance of the second determination where the temporary delegation of authority has not expired, performing a first attempt to validate that the temporary delegation of authority to the first entity is valid; and in a first instance of the first attempt where the temporary delegation of authority to the first entity is validated as being valid, concluding that the first entity truly has the authority to complete the onboarding; and based on the validating, terminating or completing the onboarding of the endpoint device by at least:

performing one or more actions to complete the onboarding of the endpoint device based on concluding that the first entity truly has the authority to complete the onboarding.

17. The endpoint device of claim 16, wherein, prior to the onboarding being started and completed, the endpoint device is in a state that is unable to provide any computer-implemented services for any entity, including the first entity, in possession of the endpoint device.

18. The endpoint device of claim 17, wherein the state is a late-bounding state where the endpoint device, prior to the onboarding being started, is not provisioned with a host operating system (OS).

19. The endpoint device of claim 16, wherein the temporary delegation of authority in the ownership voucher has not been previously validated by another entity or computing device before being validated by the endpoint device after a start of the onboarding of the endpoint device.

20. The endpoint device of claim 16, wherein the onboarding is part of a zero-touch secure provisioning (ZTSP) process, and the first entity attempting to complete the onboarding of the endpoint device has physical possession over the endpoint device.

\* \* \* \* \*